United States Patent [19]

Lyon et al.

[11] 3,754,169

[45] Aug. 21, 1973

[54] RECTIFIER BRIDGE

[75] Inventors: Russell P. Lyon, Auburn; Paul W. Koenig, Clyde, both of N.Y.

[73] Assignee: General Electric Company, Syracuse, N.Y.

[22] Filed: Feb. 2, 1970

[21] Appl. No.: 7,454

Related U.S. Application Data

[62] Division of Ser. No. 818,681, April 28, 1969, Pat. No. 3,573,516.

[52] U.S. Cl. ..... 317/234 R, 317/234 W, 317/235 D, 317/234 G, 317/234 N, 317/235 E

[51] Int. Cl. ..... H01l 17/00

[58] Field of Search ..... 317/234, 235

[56] References Cited

UNITED STATES PATENTS

| | | | |
|---|---|---|---|
| 3,462,655 | 8/1969 | Coblenz | 317/234 |
| 3,356,914 | 12/1967 | Whigham et al. | 317/234 |
| 3,200,311 | 8/1965 | Thomas et al. | 317/234 |
| 3,463,970 | 8/1969 | Gutzwiller | 317/234 |

*Primary Examiner*—John W. Huckert
*Assistant Examiner*—E. Wojciechowicz
*Attorney*—Robert J. Mooney, Carl O. Thomas, Frank L. Neuhauser, Oscar B. Waddell, Joseph B. Forman and Nathan J. Cornfeld

[57] ABSTRACT

A rectifier bridge assembly is mounted against a heat receiving surface which may be a housing of an alternator. The bridge assembly includes a plurality of stacks each including an input lead located between junction containing semiconductor elements. A plate overlies the stacks in electrically conductive relation thereto to form a conduction path for rectified current. A dielectric surrounds the senuconductor elements to protect them against contamination.

4 Claims, 11 Drawing Figures

Patented Aug. 21, 1973 3,754,169

3 Sheets-Sheet 1

Figures 1, 2, 3:
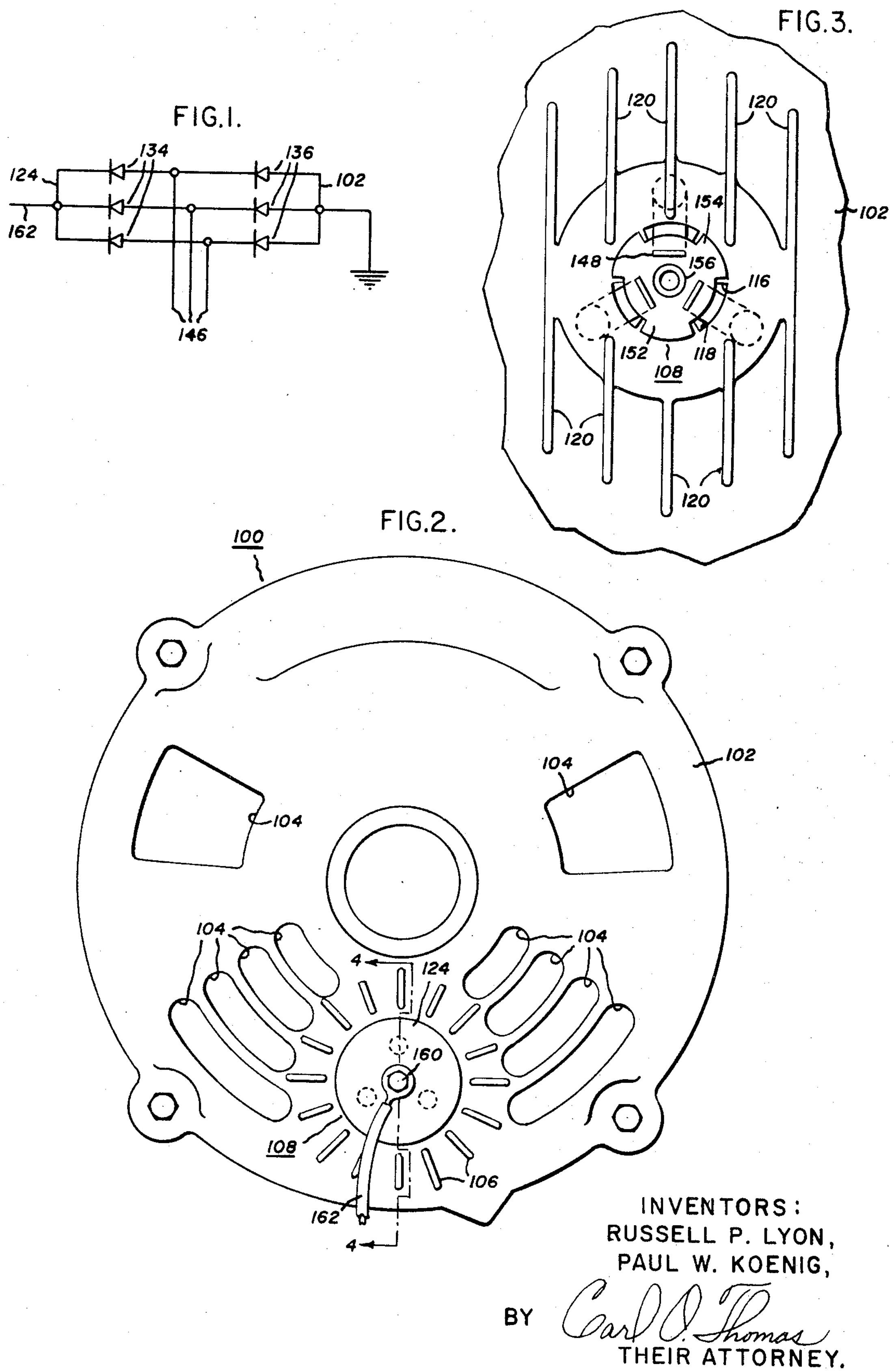

INVENTORS:
RUSSELL P. LYON,
PAUL W. KOENIG,

BY Carl O. Thomas
THEIR ATTORNEY.

Patented Aug. 21, 1973

3,754,169

3 Sheets-Sheet 2

INVENTORS:
RUSSELL P. LYON,
PAUL W. KOENIG,

BY Carl O. Thomas
THEIR ATTORNEY.

INVENTORS:
RUSSELL P. LYON,
PAUL W. KOENIG,

BY Carl O. Thomas
THEIR ATTORNEY.

RECTIFIER BRIDGE

Our invention relates to a novel bridge arrangement for obtaining a rectified electrical output. this application contains subject matter common to and relies for its effective filing date on copending application Ser. No. 818,681, filed Apr. 23, 1969.

It is conventional practice to utilize with a three phase alternator, such as is incorporated in an automobile, for example, a rectifier bridge to convert the three phase alternating current output of the alternator into a rectified form more easily distributed and used. Typically the rectifier bridge and alternator have been independently constructed each to perform its intended function. Accordingly the desired overall electrical function of a rectified electrical output is attained only at the combined cost of both an alternator and a bridge rectifier plus an additional cost to bring the two into association.

It is an object of our invention to provide a rectifier bridge capable of cooperation with a heat receiving substrate to form a simple, efficient, low cost composite which effectively performs the functions of rectification of alternating current and heat dissipation with maximum ease of assembly and function sharing.

It is an additional object to provide a rectifier bridge of novel and improved construction.

These and other objects of our invention are accomplished in one aspect by providing the combination comprised of first and second spaced parallel semiconductive discs each having inner and outer major planar surfaces. The first semiconductive disc is of P type conductivity and has laterally spaced N type conductivity regions adjacent the inner surface each forming separate rectifying junctions within said P type conductivity disc. The second semiconductive disc is of N conductivity type and has laterally spaced P type conductivity regions adjacent the inner surface thereof each forming separate rectifying junctions within the N type conductivity disc. The P type regions in the second semiconductive disc are aligned with the N type regions in the first semiconductive element. Electrically conductive means are interposed between the semiconductive discs including separate conductive means contacting the aligned N type and P type conductivity regions in the first and second semiconductive discs, respectively, to deliver an alternating current thereto. Means overlie the outer surfaces of the semiconductive discs in thermally and electrically conductive relation thereto, and means peripherally surround the semiconductive discs to protect the discs against contamination.

In another aspect our invention is directed to a rectifier bridge sub-assembly comprising a dielectric substrate having first and second opposed major surfaces and a plurality of spaced conductors therein extending between the major surfaces. A plurality of conductive strips are adhered to each major surface of the substrate extending from a point engaging a conductor to a point remote therefrom. Semiconductive pellet means are associated with each conductive strip at a point remote from the associated conductor. Each semiconductive pellet means includes a semiconductive element having regions of opposite conductivity type forming a junction therebetween. Electrically conductive contact means overlie the semiconductive element, and dielectric passivant means peripherally surround the semiconductive element and cooperate with the contact means and strip to sealingly encase the element. The semiconductive elements are associated with opposite surfaces of the substrate having regions of opposite conductivity type in contact with the conductive strips. Each of the conductors are associated with one conductive strip on each of the opposed major surfaces and are adapted for association with alternating current electrical input leads.

Figures 4, 5, 6, 7:
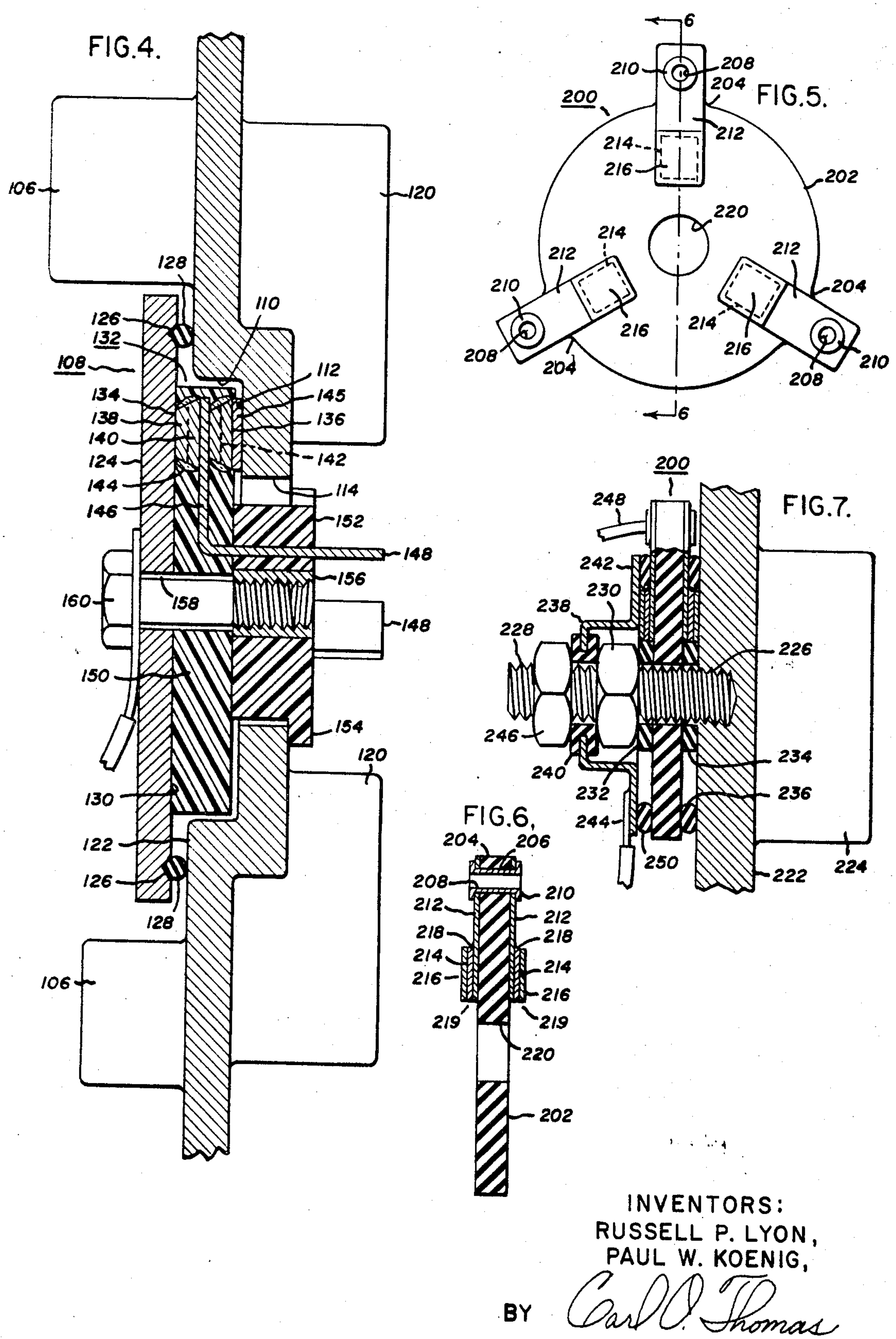
Figure 8:
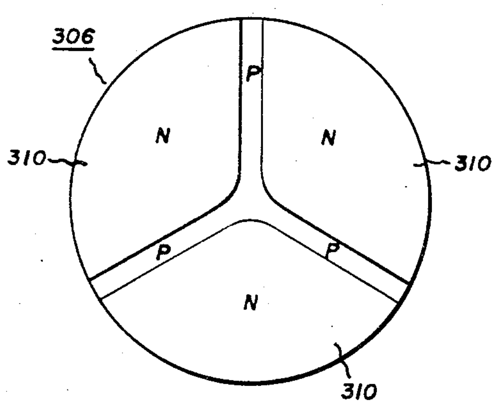
Figure 9:
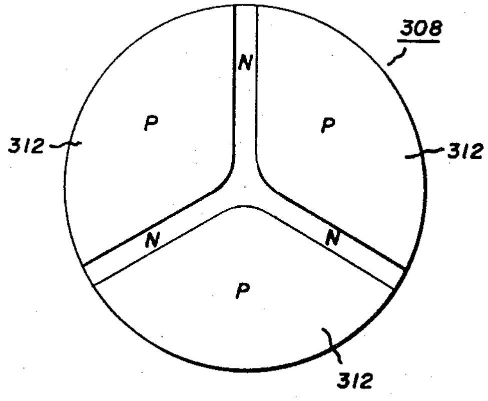
Figure 10:
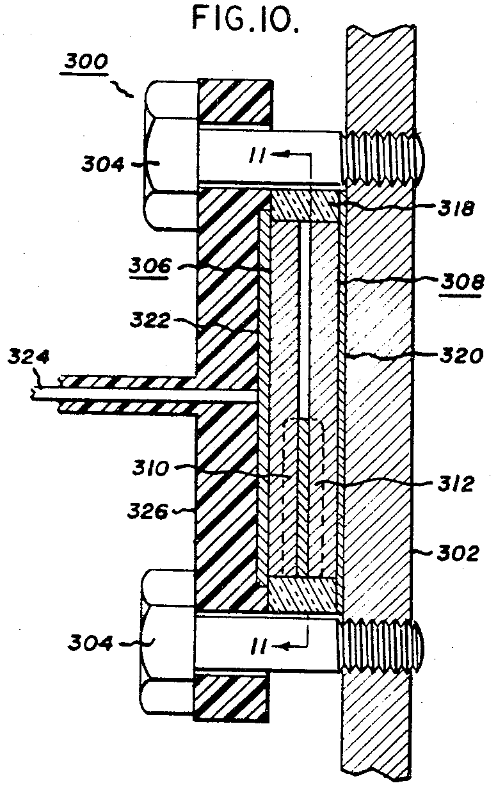
Figure 11:
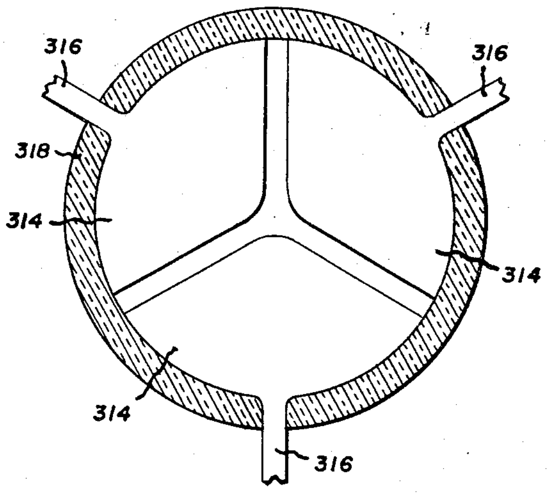

Our invention may be better understood by reference to the following detailed description considered in conjunction with the drawings, in which FIG. 1 is a circuit diagram of a three phase alternating current rectifier bridge, FIG. 2 is an en view of an alternator and rectifier bridge constructed according to our invention, FIG. 3 is an elevation of a rectifier bridge according to our invention with portions of the associated alternator broken away, FIG. 4 is a sectional view taken along section line 4—4 in FIG. 2, FIG. 5 is an elevation of a modified bridge sub-assembly, FIG. 6 is a sectional view taken along section line 6—6 in FIG. 5, FIG. 7 is a sectional view of a rectifier including our modified bridge sub-assembly in combination with a heat sink, FIGS. 8 and 9 are elevations of semiconductive discs formed according to our invention, FIG. 10 is a sectional view of a rectifier bridge incorporating the semiconductor discs, and FIG. 11 is a sectional view taken along section line 11—11 in FIG. 10.

Referring initially to FIGS. 1 through 4 inclusive, a three phase alternator 100 is provided with a housing end bell 102 formed of metal so that it is both thermally and electrically conductive. The housing end bell is provided with a plurality of air circulation ports 104. On the exterior surface of the housing a plurality of heat dissipation fins 106 are provided. Preferably the housing end bell is formed by casting, and the heat dissipation fins are formed integrally with the housing during casting. The housing end bell is provided with a recess 110 having an outer surface 112 located therein. The end bell is provided with an aperture located centrally within the recess having a plurality of lugs 116 formed integrally with the end bell projecting thereinto. The lugs are circumferentially spaced to define grooves 118 therebetween. Integrally formed heat dissipation fins 120 are formed on the interior surface of the end bell. A sealing surface 122 is provided on the exterior surface of the end bell peripherally of the recess.

A rectifier bridge assembly 108 is provided with a thermally and electrically conductive plate 124 having an annular recess or seat 126 machined therein. An O-ring seal 128 is sealingly fitted between the seat and the sealing surface 122. Interposed between the inner surface 130 of the plate and the outer surface 112 of the recessed end bell are three identical stacks 132. Each stack is comprised of semiconductive elements or pellets 134 and 136. Each of the semiconductive pellets is formed of a semiconductive crystal formed of a first region 138 of one conductivity type and a second region 140 of an opposite conductivity type. A junction 142 is formed at the intersection of the first and second regions within each semiconductive crystal. To improve the ability of the semiconductive crystals to withstand high blocking voltages they are shown beveled around their periphery, as is conventional practice. To protect the semiconductive crystals from contamination a passivant layer 144 is positioned around the periphery of each semiconductive crystal. The passivant layer is formed of a substantially impervious dielectric material having a high resistivity and high dielectric strength. It is preferred to utilize glass to form the passivant layer, although dielectrics, such as silicone rubbers, for example, may also be employed with a lesser degree of effectiveness. One major surface of the semiconductive element 134 in each stack lies in intimate thermally and electrically conductive relation with the conductive plate 124 while a second major surface of opposite conductivity type of the pellet 136 in each stack lies in intimate thermally and electrically conductive relation with a contact element 145, which may be a disc of a metal having a thermal coefficient of expansion which approximates that of the semiconductor crystal, such as tungsten or molybdenum, for example. The contact element forms a low impedance thermal and electrical interconnection between the semiconductor elements 136 and the outer surface of the recessed end bell.

In each stack interposed between the remaining major surfaces of the pellets 134 and 136 is an electrically conductive strip 146. A portion 148 of each strip extends inwardly through the aperture in the end bell of the alternator to form input terminals for the rectifier bridge assembly that cooperate with output leads of the alternator, not shown. A dielectric potting material 150, such as silicone, epoxy, or phenolic resin, surrounds and encapsulates the semiconductor elements and a portion of each strip 146. The contact elements protrude slightly from the encapsulant to assure that they securely engage the outer surface of the recess.

Fitted over the portions 148 of the strips is a lock coupler 152 having a plurality of lugs 154 peripherally formed thereon. The lugs 154 are sized to be smaller than the grooves 118 so that they can readily pass therethrough. Centrally formed in the coupler is a threaded sleeve 156. The threaded sleeve is aligned with a somewhat larger bore 158 in the plate and potting material. A mounting bolt 160 passes through the bore and is engaged with the threaded sleeve. An output lead 162 is pressed into engagement with the plate by the bolt.

It can be readily appreciated that the rectifier bridge assembly and alternator end bell may be easily constructed and assembled. The alternator end bell with the heat dissipation fins, recess, and aperture may be formed simply by known metal casting techniques. The plate 124, semiconductive element 134, strip 146, semiconductive element 136, and contact element 145 may be formed as a stack by soldering the adjacent elements into engagement. Thereafter or alternatively the potting material 150 may be molded around the elements. The central bore 158 in the plate and potting material require no special mold configuration to form, since it may, if desired, be formed after the potting material is molded in place. The lock coupler 152 can be separately molded and thereafter slipped over the ends of the strips. The lock coupler 152 need not be permanently attached to the strips. Alternatively, the lock coupler may, if desired, be formed integrally with the potting material. The lugs 154 of the lock coupler may be reinforced, if desired. For example, reinforcing fingers may be joined to the threaded sleeve 156.

A very significant advantage of the rectifier bridge assembly and alternator as shown is that the rectifier assembly may be connected to the alternator after it is otherwise completely assembled. It is merely necessary to pass the lugs of the lock coupler through the grooves in the aperture of the end bell after the output leads of the alternator have been attached to the strips of the rectifier assembly. Then by turning the rectifier assembly slightly so that the lugs of the rectifier assembly overlie the lugs of the alternator end bell and inserting and tightening the bolt 160 the rectifier assembly is fully operational. If the lock coupler can be brought into position from the inside of the end bell of the alternator, as by attaching the rectifier assembly to the end bell before the end bell is attached to the alternator, there is no necessity of providing grooves in the aperture of the end bell and the lock coupler can be provided with an annular flange rather than lugs. Assembly of the rectifier bridge assembly is then simplified to the tightening of one bolt in order to both mount the assembly and connect the output electrical lead which carries the rectified electrical output for external use. It is, of course, recognized that the lock connector 152 and potting material 150 may be simultaneously cast with the rectifier bridge assembly in position on the end bell. In this circumstance the bolt 160 merely attaches the output lead, since the rectifier bridge assembly is permanently locked to the alternator end bell.

The electrical characteristics of the rectifier bridge assembly may be easily understood by reference to FIG. 1. The semiconductive pellets 134 and 136 in each stack act as rectifiers. The conductive strips 146 deliver a three phase alternating current electrical input to the stacks between th pellets 134 and 136. Depending on the polarity of the input delivered to each stack, the input signal will either be conducted to the output lead 162 through the pellet 134 and the plate 124 or to ground through the pellet 136 and the alternator end bell 102, since the alternator housing is conventionally grounded. It is appreciated that the rectifier bridge assembly may be easily adapted for a single phase input merely by omitting connection to one of the input terminals represented by strip portions 148 or by eliminating one stack entirely. With a high voltage application a plurality of rectifiers may be provided in series merely by doubling or tripling the number of semiconductive pellet means in each stack.

As is well understood in the art, when semiconductive elements are conducting current, they generate heat. Unless provision is made for conducting heat away from the semiconductive elements as quickly as it is generated they may be damaged by over heating. In the form shown the conductive plate 124 and end bell 102 act as heat sinks for the semiconductive pellets, since each pellet is provided with a major surface in low impedance electrical and thermal association with one plate. The remaining major surfaces of the pellets are in contact with the conductive strips 146 allowing an additional, although less efficient, heat dissipation path. The major portion of the generated heat is rejected from the rectifier bridge assembly through the alternator end bell. This eliminates the necessity of providing heat dissipation fins as a part of the rectifier bridge assembly, although such fins could be included if desired. The arrangement provided differs from conventional alternator bridge assemblies in that the bridge need not itself be provided with heat dissipation fins nor is it essential that the location of the bridge be chosen to allow impingement of air directly on the rectifier bridge assembly.

It is a novel feature of our rectifier bridge assembly that heat is primarily rejected through the alternator housing. This then eliminates any necessity of mounting the rectifier bridge assembly for direct impingement by ambient air in order to achieve the desired level of cooling. Accordingly, the amount of contaminants that are brought into contact with the bridge assembly may be greatly reduced. This allows the further advantage that the degree of con-taminant protection provided for the semiconductive crystals making up the pellets can be reduced with less risk to reliability. Or, alternately stated, comparable levels of reliability can be achieved with less contaminant protection. For example, it may be desirable to eliminate the potting material or to utilize a potting material less impervious to contaminants than has been used in the past. The O-ring seal may be omitted or may be replaced with a non-sealing electrically insulative spacer. Also, the passivant immediately surrounding the semiconductive elements may be omitted. Generally at least one of the O-ring seal, glass passivant, and potting material shown would be retained to protect the semiconductive elements. In the preferred form illustrated it is considered that the rectifier bridge assembly possesses a substantially greater level of protection against contamination of the semiconductive crystals making up the pellets than is afforded by rectifier constructions heretofore known to the art.

To illustrate the diversity of our invention, in FIGS. 5 and 6 a rectifier bridge sub-assembly 200 is illustrated. The sub-assembly includes a dielectric substrate 202 having angularly spaced ear portions 204 each provided with an aperture 206. An annular metal eye 208 is fitted into each aperture and provided with a rolled edge 210 at each end that overlies a conductive strip 212, which may be metallization printed onto the substrate. the conductive strips associated with each eye are located in opposed relation on opposite major surfaces of the substrate. Attached to each strip at a point remote from the aperture with which it is associated is a semiconductive element 214. The semiconductive elements each are provided with at least one rectifying junction. The semiconductive elements adjacent one major surface of the substrate are mounted with an N-type conductivity surface next adjacent the conductive strips, and the semiconductive elements adjacent the opposite major surface are mounted with a P-type conductivity surface next adjacent the conductive strips. The semiconductive elements may conveniently be soldered to the conductive strips by conventional techniques. Overlying the semiconductive elements so as to cover the remaining major surface thereof not contacting the strips are contact plates 216, which are preferably soldered to the semiconductive elements. A dielectric passivant material such as silicone rubber or glass seals the periphery of the semiconductive elements left exposed by the strips and contact plates. Each semiconductive element together with its associated dielectric passivant and contact plate forms a semiconductive pellet 219. A central aperture 220 is provided in the rectifier sub-assembly.

in FIG. 7 the rectifier sub-assembly is shown in a typical application. A thermally and electrically conductive member 222, which may be an alternator housing, is provided with at least one heat dissipation fin 224. The conductive member is provided with a threaded blind bore 226. A stud is threaded into the bore and is provided with a nut 230 fixed thereto. The fixed nut bears against a sandwich provided by the dielectric substrate and two flanking insulative washers 232 and 234. The fixed nut and stud hold the rectifier sub-assembly in position with the outer surface of the semiconductive pellets adjacent one major surface bearing against the inner surface of the conductive member 222 in thermally and electrically conductive relation. To supplement the dielectric passivant associated with the sub-assembly in protecting the semiconductive elements fron contamination an O-ring seal 236 is interposed between the sub-assembly and the inner surface of the conductive member.

An annular housing 238 provided with a central insulative lining 240 is mounted on the stud ot overlie the fixed nut and provide an insulative flange 242 in electrically conductive relation with the semiconductive pellets of the rectifier sub-assembly. An electrical output lead 244 is shown welded to the flange. A nut 246 is provided rotatably threaded to the stud to urge the annular housing into engagement with the rectifier sub-assembly. The alternating current input leads 248 for the rectifier bridge assembly are inserted into the eyes 208 of the sub-assembly. An O-ring seal 250 is interposed between the rectifier sub-assembly and the annular housing. While the construction of the modified rectifier bridge assembly of FIG. 7 differs substantially from that of FIGS. 2 through 4 inclusive, the function and advantages are similar.

In FIGS. 8 through 11 inclusive a more compact form of our invention is shown. Rectifier bridge assembly 300 is mounted in thermally and electrically conductive relation to member 302 by bolts 304. A significant distinction of the rectifier bridge assembly 200 is that the number of semiconductive elements is reduced from six in the other bridge assemblies disclosed to two. The bridge assembly is comprised of planar semiconductor discs 306 and 308. The disc 306 is formed generally of P type conductivity semiconductive material into which three radially arranged N type conductivity areas 310 have been formed. Each of the N type conductivity areas lie adjacent the inner major surface of the semiconductor disc—that is, the major surface next adjacent the disc 308. The semiconductive disc 308 is formed generally of N type conductivity semiconductive material into which three radially arranged P type conductivity areas 312 have been formed. The areas 310 and 312 are of similar geometric configuration and are aligned in the completed bridge assembly. Three separate contact members 314 are interposed between the spaced, parallel inner surfaces of the semiconductor discs. The contact members are of a geometrical configuration to provide a low impedance electrical contact to one N type conductivity area and one aligned P type conductivity area of the semiconductor discs 306 and 308, respectively. Each of the contact members are shown provided with an integrally formed tab 316 for connection to a three phase alternating current source.

The tabs extend radially outwardly through a glass passivant ring 318 that protects the discs against contamination. It is to be noted that only a single glass passivant ring is required to protect both discs, whereas in the remaining rectifier bridge assemblies six separate glass passivant layers are provided to accomplish the same result. A thin thermally and electrically conductive layer 320 is noted to overlie and protect the outer major surface of the semiconductor disc 308. If it were desired to form the rectifier bridge assembly integrally with the member 302, this element could be omitted entirely. While a void is shown between the laterally spaced contact members 314, for high voltage applications a dielectric such as glass or silicone rubber could be provided filling this void space to insure that arcing does not occur between members 314 should large potential differences be encountered.

To provide electrical contact to the outer major surface of the semiconductor disc 306 an electrically conductive member 322 is provided. A low impedance electrical connection exists between the conductive member 322 and the electrical output lead 324. To allow for mounting the bridge assembly an insulative plate 326 is provided. The plate may, for example, be a reinforced resin member molded around the conductive member 322 and output lead. In an alternate form the conductive member 322 may be constructed of heavier gauge metal and the insulative plate 326 eliminated. In this arrangement insulative bushings may be used to electrically isolate the bolts from the conductive members 322. It is appreciated that the plates 320 and 322, discs 306 and 308, glass passivant 318, and contact members 314 could be readily constructed as a unitary sub-assembly capable of performing in itself all the electrical functions of a rectifier bridge assembly. If desired, other conventional passivants, such as silicone rubber, may be substituted for glass passivant 318.

The rectifier bridge assembly 300 functions similarly as the preceding rectifier bridge assemblies. It should be noted, however, that the construction of the rectifier bridge assembly is greatly simplified with the total number of elements required to form the rectifying function being greatly reduced.

While our rectifier bridge assembly has been specifically disclosed in connection with an alternator, it is appreciated that the bridge assembly may be mounted by other thermally and electrically conductive elements which are capable of serving both as a conduction path and a heat sink in association with the bridge assembly. While we have disclosed our invention with reference to the rectification of three phase alternating current, it is appreciated that our invention may be applied to the rectification of single phase alternating current without the exercise of invention.

What we claim and desire to secure by Letters Patent of the United States is:

1. The combination comprising first and second spaced parallel semiconductive discs each having inner and outer major planar surfaces, said inner surfaces lying in opposed, spaced parallel relation, said first semiconductive disc being of P type conductivity and having laterally spaced N type conductivity regions adjacent said inner surface each forming separate rectifying junctions within said P type conductivity disc, said second semiconductive disc being of N type conductivity and having laterally spaced P type conductivity regions adjacent said inner surface thereof each forming separate rectifying junctions within said N type conductivity disc, said P type regions in said second semiconductive disc being aligned with said N type regions in said first semiconductive element., electrically conductive means interposed between and contacting said inner major surfaces of said semiconductive discs including a separate planar contact member interposed between said inner major surfaces contacting each aligned pair of N type and P type conductivity regions in said first and second semiconductive discs, respectively, over opposed surfaces thereof to deliver an alternating current thereto, first and second means overlying the outer surfaces of said semiconductive discs in electrically conductive relation thereto, said first means overlying one of said outer surfaces being thermally conductive and serving as the major heat removal path from said semiconductive discs, and means peripherally surrounding said semiconductive discs to protect said discs against contamination.

2. The combination according to claim 1 in which said peripheral means for protecting said discs against contamination is comprised of unitary passivant means, said first and second overlying means are comprised of first and second plates overlying said outer major surfaces of said first and second semiconductive discs, respectively, and said unitary passivant means is sealingly associated with said plates so that said unitary passivant means and said plates completely surround and package said semiconductive discs.

3. A rectifier bridge sub-assembly comprising a dielectric substrate having first and second opposed major surfaces and a plurality of spaced conductors therein extending between said major surfaces, a plurality of conductive strips adhered to each major surface of the substrate extending laterally therealong from a point engaging a conductor to a point remote therefrom, separate semiconductive pellet means associated with each conductive strip at a point remote from the associated conductor, each of said separate semiconductive pellet means including a separate semiconductive element having regions of opposite conductivity type forming a junction therebetween, electrically conductive contact means overlying said semiconductive element, and dielectric passivant means peripherally surrounding said semiconductive element and cooperating with said contact means and strip to sealingly encase said element, said semiconductive elements associated with opposite surfaces of said substrate having regions of opposite conductivity type in contact with said conductive strips, and each of said conductors being associated with one conductive strip on each of said opposed major surfaces and being adapted for association with alternating current electrical input leads.

4. A rectifier bridge sub-assembly according to claim 3 in which said dielectric substrate is provided with a central aperture and said sub-assembly additionally includes a housing having a central aperture providing an electrically conductive engagement with each of said contact means associated with said semiconductive pellet means adjacent one of said major surfaces and means extending through the apertures for relatively positioning said housing and said substrate and for mounting said contact means not associated with said housing in engagement with a heat receiving substrate.

* * * * *

UNITED STATES PATENT OFFICE
CERTIFICATE OF CORRECTION

Patent No. 3,754,169 Dated August 21, 1973

Inventor(s) Russell P. Lyon

It is certified that error appears in the above-identified patent and that said Letters Patent are hereby corrected as shown below:

IN THE ABSTRACT:

Line 8, change "senuconductor" to -- semiconductor --.

Signed and sealed this 30th day of July 1974.

(SEAL)
Attest:

McCOY M. GIBSON, JR.
Attesting Officer

C. MARSHALL DANN
Commissioner of Patents